US011481089B2

(12) United States Patent
Montgomery et al.

(10) Patent No.: US 11,481,089 B2
(45) Date of Patent: Oct. 25, 2022

(54) GRAPHICAL USER INTERFACE TO CONFIGURE PARAMETERS OF AN API BASED ON USER INPUTS

(71) Applicant: Xano, Inc., Woodland Hills, CA (US)

(72) Inventors: Sean Montgomery, Woodland Hills, CA (US); Jacques Antikadjian, Woodland Hills, CA (US); Prakash Chandran, Woodland Hills, CA (US)

(73) Assignee: Xano, Inc., Woodland Hills, CA (US)

( * ) Notice: Subject to any disclaimer, the term of this patent is extended or adjusted under 35 U.S.C. 154(b) by 129 days.

(21) Appl. No.: 16/990,338

(22) Filed: Aug. 11, 2020

(65) Prior Publication Data
US 2022/0050558 A1 Feb. 17, 2022

(51) Int. Cl.
*G06F 3/0482* (2013.01)
(52) U.S. Cl.
CPC .................................. *G06F 3/0482* (2013.01)
(58) Field of Classification Search
CPC ..................................................... G06F 3/0482
See application file for complete search history.

(56) References Cited

U.S. PATENT DOCUMENTS

| 10,628,133 | B1 * | 4/2020 | Jiang | ........................ | H04L 51/02 |
| 2003/0001896 | A1 * | 1/2003 | Johnson | ..................... | G06F 8/71 |
| | | | | | 715/771 |
| 2004/0233236 | A1 * | 11/2004 | Yang | ....................... | G06F 9/451 |
| | | | | | 719/328 |
| 2005/0257190 | A1 * | 11/2005 | Shaburov | .................. | G06F 8/38 |
| | | | | | 717/121 |

OTHER PUBLICATIONS

Axway API Management, "Demo | Design and Build your APIs using Stoplight and API Builder," published on Apr. 4, 2019, available at https://youtu.be/7VVYnRdGhbU, 6 minutes and 31 seconds. (Year: 2019).*
Dataleon, "Top 10 API gateways for API management to try in 2020," published on Mar. 5, 2020, available at https://medium.com/young-app-platform/top-10-api-gateways-for-api-management-to-try-in-2020-2488d03c0952, 7 pages. (Year: 2020).*

* cited by examiner

*Primary Examiner* — Dino Kujundzic
(74) *Attorney, Agent, or Firm* — Schwegman Lundberg & Woessner, P.A.

(57) ABSTRACT

Systems and methods of configuring an Application Programming Interface (API) based on inputs which received through interface elements presented within a graphical user interface (GUI). The system to configure an API performs operations that include: causing display of a GUI that comprises a presentation of a plurality of interface elements; receiving a selection of an interface element from among the plurality of interface elements; presenting a menu element in response to the selection of the interface element; receiving a user input via the menu element; and configuring an API based on the user input received via the menu element, wherein the user input may define one or more parameters of the API.

16 Claims, 12 Drawing Sheets

400

CAUSING DISPLAY OF A GRAPHICAL USER INTERFACE (GUI) THAT COMPRISES A PRESENTATION OF A PLURALITY OF INTERFACE ELEMENTS
402

RECEIVING A SELECTION OF AN INTERFACE ELEMENT FROM AMONG THE PLURALITY OF INTERFACE ELEMENTS
404

PRESENTING A MENU ELEMENT IN RESPONSE TO THE SELECTION OF THE INTERFACE ELEMENT
406

RECEIVING A USER INPUT VIA THE MENU ELEMENT
408

CONFIGURING AN APPLICATION PROGRAMMING INTERFACE (API) ENDPOINT BASED ON THE USER INPUT RECEIVED VIA THE MENU ELEMENT
410

RECEIVING A USER INPUT THAT DEFINES A SET OF INPUT PARAMETERS OF AN INPUT TO AN API ENDPOINT BASED ON SELECTIONS RECEIVED THROUGH A MENU ELEMENT PRESENTED IN A GUI, THE SET OF INPUT PARAMETERS INCLUDING AN INPUT IDENTIFIER
502

RECEIVING AN INPUT THAT SELECTS A SECOND INTERFACE ELEMENT AMONG A PLURALITY OF INTERFACE ELEMENTS
504

PRESENTING A SECOND MENU ELEMENT IN RESPONSE TO THE INPUT THAT SELECTS THE SECOND INTERFACE ELEMENT, THE SECOND MENU ELEMENT INCLUDING A DISPLAY OF THE INPUT IDENTIFIER OF THE INPUT TO THE API ENDPOINT
506

FIG. 5

600
RECEIVING AN INPUT THAT DEFINES A PARAMETER OF A COMMAND VIA A MENU ELEMENT PRESENTED WITHIN A GUI
602
GENERATING PSEUDO-CODE BASED ON THE COMMAND
604
CAUSING DISPLAY OF THE PSUEDO-CODE WITHIN THE MENU ELEMENT
606
FIG. 6

700

GENERATING A FUNCTION BASED ON A USER INPUT RECEIVED THROUGH A MENU ELEMENT OF A GUI, THE FUNCTION COMPRISING A COMMAND THAT DEFINES A VARIABLE
702

CAUSING DISPLAY OF AN INTERFACE ELEMENT THAT REPRESENTS THE FUNCTION AT A POSITION AMONG A SEQUENCE OF INTERFACE ELEMENTS, THE INTERFACE ELEMENT PRECEDING A SECOND INTERFACE ELEMENT
704

RECEIVING AN INPUT THAT SELECTS THE SECOND INTERFACE ELEMENT
706

PRESENTING A MENU ELEMENT THAT COMPRISES A DISPLAY OF A SET OF VARIABLES IN RESPONSE TO THE INPUT THAT SELECTS THE SECOND INTERFACE ELEMENT, THE DISPLAY OF THE SET OF VARIABLES INCLUDING THE VARIABLE DEFINED BY THE COMMAND BASED ON THE POSITION OF THE INTERFACE ELEMENT AMONG THE SEQUENCE OF INTERFACE ELEMENTS
708

GRAPHICAL USER INTERFACE TO CONFIGURE PARAMETERS OF AN API BASED ON USER INPUTS

TECHNICAL FIELD

Embodiments of the present disclosure relate generally to systems for generating and configuring an Application Programming Interface endpoint.

BACKGROUND

Automatic programming is a type of computer programming in which a mechanism generates a computer program to allow a human program to write code at a higher abstraction level. For example, systems exist which automate the creation of source code construction for all or part of a software application based on inputs received through a user interface or input file, from which syntactically correct high-level source code (for example C++, C#, Java, Python, Ruby, Perl, etc.) is automatically created. The created source code can be compiled or interpreted by the appropriate computerized system and subsequently executed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating various operations of an API builder system in performing a method for configuring an API endpoint based on a user input received via a menu element, according to certain example embodiments.

FIG. 5 is a flowchart illustrating various operations of an API builder system in performing a method for configuring an API endpoint based on a user input received via a menu element, according to certain example embodiments.

FIG. 6 is a flowchart illustrating various operations of an API builder system in performing a method for presenting a GUI to receive inputs to configure an API endpoint, according to certain example embodiments.

FIG. 7 is a flowchart illustrating various operations of an API builder system in performing a method for configuring an API endpoint based on a user input received via a menu element, according to certain example embodiments.

FIG. 10 illustrates an interface diagram depicting a GUI which may be presented by an API builder system, according to certain example embodiments.

DETAILED DESCRIPTION

Figure 1:
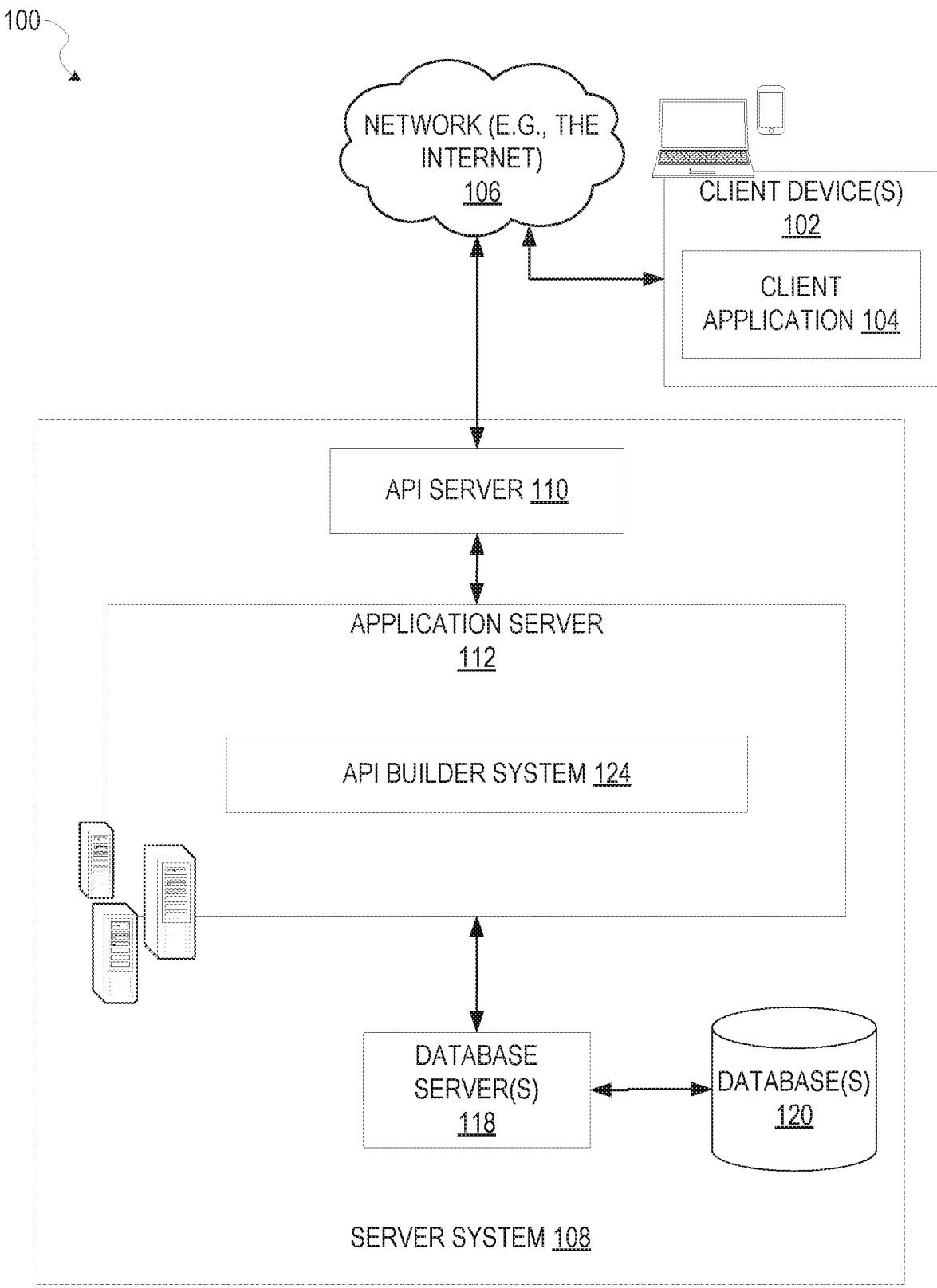
FIG. 1 is a block diagram showing an example system for exchanging data over a network in accordance with some embodiments, wherein the system includes an API builder system.

An Application Programming Interface (API) API is a computing interface which defines interactions between multiple software intermediaries. It defines the kinds of calls or requests that can be made, a calling sequence of a call stack, how to make them, the data formats that should be used, as well as the conventions to follow. An API works by sending requests for information from a web application or web server and receiving a response, wherein the requests comprise inputs based on the requirements and configurations of the API. Traditionally, configuring an API requires a programmer to write custom code to perform specific commands of the API, which can often be prohibitively expensive or time consuming. Furthermore, the process of writing custom code generally requires significant debugging. As a result, a programmer may ultimately spend more time correcting errors in debugging that they would focusing on overall design and methodology of the software. Accordingly, a system which streamlines the process of developing custom code without the need of specialized programming knowledge would provide an improvement over existing systems.

Embodiments of the present disclosure relate generally to systems and methods of configuring an API based on inputs which may be received through interface elements presented within a GUI. In various embodiments described herein, a system to configure an API may perform operations that include: causing display of a GUI that comprises a presentation of a plurality of interface elements; receiving a selection of an interface element from among the plurality of interface elements; presenting a menu element in response to the selection of the interface element; receiving a user input via the menu element; and configuring an API based on the user input received via the menu element, wherein the user input may define one or more parameters of the API.

In some example embodiments, the user input may provide an input that defines or otherwise selects parameters associated with an API, such as an input of the API, a function of a function stack that comprises one or more functions of the API, or a response which may be generated by the API. For example, in the context of an API input, a user input through an interface element of a GUI may define parameters of the input, such as an identifier of the input, as well as an input type of the input. For example, an input type may include one or more of: a button; a checkbox which allows a value to be selected or deselected; a color, wherein the color provides a control for specifying a color based on a selection of colors which may be activated; a date, wherein the date provides a control for entering a date (i.e., year, month, and day), wherein the control may provide an element to select or specify the date; email, wherein the email control may provide a control for providing an email as a text input; file, wherein the file control may provide users with an element to select a file to be uploaded; a hidden input control, wherein the hidden input control provides a means for a web page to submit value to the API; a radio selection, wherein the radio selection control provides a button to provide selections of one or more corresponding options; and text, wherein the text control provides an input field to receive a text input. Additional input types may be specified based on an input received through the interface element. Accordingly, the selection provided by the user may cause the system to access a repository that comprises a plurality of code extensions, wherein each code extension among the plurality of code extensions comprises a segment of code that defines a command or function to be performed by the extension. Accordingly, in certain embodiments, the segment of code of the code extension may include a template that comprises one or more fields to be populated based on inputs received based on selections of elements from within a GUI in order to automatically generate code.

In some embodiments, the user input may provide an input that defines or otherwise selects parameters in which to configure a function of a function stack associated with an API, wherein each function may have corresponding commands. For example, as discussed above, a user may provide an input that selects a menu element from among a set of menu elements in order to define parameters of a function, such as a command, the type of command, as well as variables applied in the command. The system may display a representation of each function of a function stack in an interface element within the GUI, wherein a position of any given function among the function stack may define a calling sequence of the function stack.

In some embodiments, a position of a representation of a function among a presentation of a set of functions of a function stack may define a calling sequence of the function stack. A user may therefore modify the calling sequence of the function stack by providing inputs that move and re-sequence the functions of the function stack within the presentation. A user may likewise provide an input to select a function from among the presentation of the function stack associated with the API, and in response, the system may display a menu element based on the position of the selected function in the function stack. As an illustrative example, a function stack may comprise a first function that comprises a first command, and a second function that comprises a second command, wherein the sequence of the functions is "first function, second function," and the first command of the first function includes a command to define a variable. Accordingly, a user may provide an input that selects the third function from among the set of functions, and in response, the system may present a menu element that includes a display of the variable defined by the first function, based on the first function occurring earlier than the second function in the calling sequence.

In some embodiments, responsive to receiving inputs to define the parameters in which to configure the API, the system may generate and cause display of a presentation of a segment of pseudo-code within an interface element of the GUI. For example, the pseudo-code may comprise a display of an informal, high-level description of code, wherein the pseudo-code includes the structural conventions of a normal programming language.

FIG. 1 is a block diagram showing an example system 100 for exchanging data over a network. The system 100 includes a client device 102, wherein the client device may execute a client application 104, and wherein the client application 104 is communicatively coupled to a server system 108 via a network 106 (e.g., the Internet). Accordingly, the client application 104 is able to communicate and exchange data with the server system 108 via the network 106. The data exchanged between client application 104, and the server system 108, includes functions (e.g., commands to invoke functions) as well as payload data (e.g., text, user inputs; selections).

The server system 108 provides server-side functionality via the network 106 to a particular client application 104. While certain functions of the system 100 are described herein as being performed by either a client application 104 or by the server system 108, it will be appreciated that the location of certain functionality either within the client application 104 or the server system 108 is a design choice. For example, it may be technically preferable to initially deploy certain technology and functionality within the server system 108, but to later migrate this technology and functionality to the client application 104 where a client device 102 has sufficient processing capacity.

The server system 108 supports various services and operations that are provided to the client application 104. Such operations include transmitting data to, receiving data from, and processing data generated by the client application 104. In some embodiments, this data includes, client device information, user input data, and text, as examples. In other embodiments, other data is used. Data exchanges within the system 100 are invoked and controlled through functions available via user interfaces (UIs) of the client application 104.

Turning now specifically to the server system 108, an API server 110 is coupled to, and provides a programmatic interface to, an application server 112. The application server 112 is communicatively coupled to a database server 118, which facilitates access to a database 120 in which is stored data associated with functions provided by the API builder system 124, and which may be processed by the application server 112.

Dealing specifically with the API server 110, this server receives and transmits data (e.g., commands and payloads) between the client device 102 and the application server 112. Specifically, the API server 110 provides a set of interfaces (e.g., routines and protocols) that can be called or queried by the client application 104 in order to invoke functionality of the application server 112. The API server 110 exposes various functions supported by the application server 112, including account registration, login functionality, and transmission of data, via the application server 112, from a client application 104. The application server 112 hosts a number of applications and subsystems, including an API builder system 124.

The application server 112 is communicatively coupled to a database server 118, which facilitates access to a database 120 in which is stored data associated with the API builder system 124.

Figure 2:
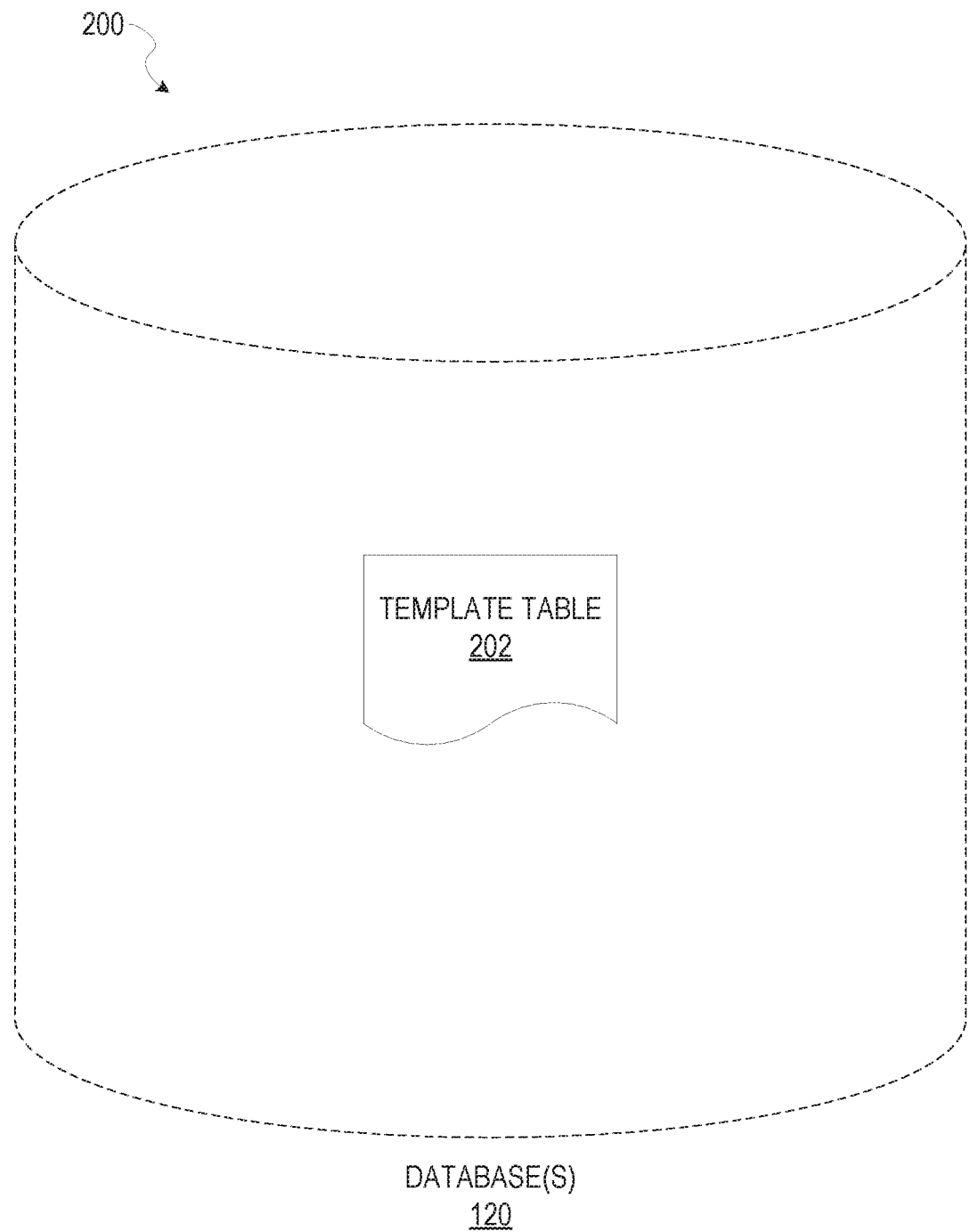
FIG. 2 is a schematic diagram illustrating data which may be stored in the database of the server system, according to certain example embodiments.

FIG. 2 is a schematic diagram 200 illustrating data 200 which may be stored in the database 120 of the server system 108, according to certain example embodiments. While the content of the database 120 is shown to comprise a number of tables, it will be appreciated that the data could be stored in other types of data structures (e.g., as an object-oriented database).

The database 120 includes data stored within an extension table 202, that comprises a set of code extensions which may correspond with interface elements that may be displayed within a GUI presented by the API builder system 124. Each code extension among the set of code extensions may for example correspond with a predefined segment of code which may be used by the API builder system 124 to configure an API, or parameters of an API. For example, the code extension may comprise a code "template" that comprises a segment of code that includes one or more fields to be populated base don inputs received via the GUI.

Figure 3:
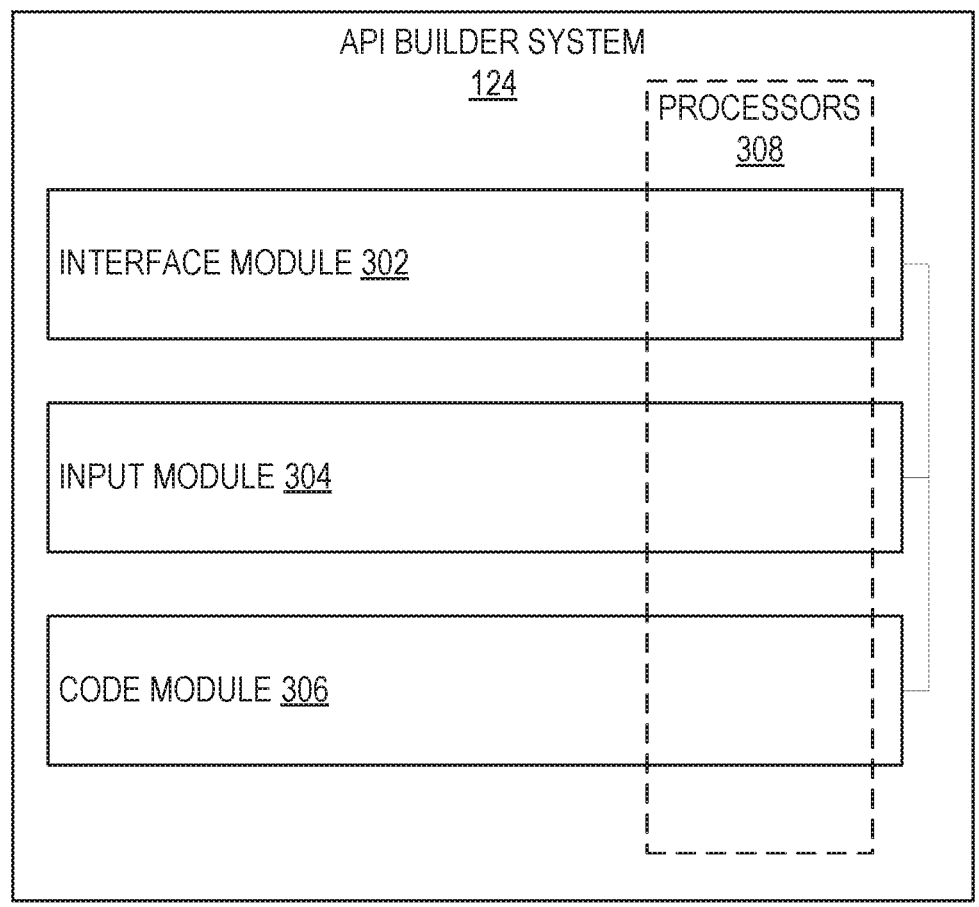
FIG. 3 is a block diagram illustrating various modules of an API builder system, according to certain example embodiments.

FIG. 3 is a block diagram illustrating components of the API builder system 124, that configure the API builder system 124 to generate and configure an API or API endpoint based on inputs that define parameters of the API, wherein the inputs include user inputs received through a GUI, according to some example embodiments. The API builder system 124 is shown as including an interface module 302, an input module 304, a code module 306, and an output module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the API builder system 124 may physically include an arrangement of one or more of the processors 310 (e.g., a subset of or among the one or more processors of the machine) configured to perform the operations described herein for that module. As another example, any module of the engagement tracking system 310 may include software, hardware, or both, that configure an arrangement of one or more processors 310 (e.g., among the one or more processors of the machine) to perform the operations described herein for that module. Accordingly, different modules of the API builder system 124 may include and configure different arrangements of such processors 310 or a single arrangement of such processors 310 at different points in time. Moreover, any two or more modules of the API builder system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating various operations of an API builder system 124 in performing a method 400 for configuring an API endpoint based on a user input received via a menu element, according to certain example embodiments. Operations of the method 400 may be performed by the modules described above with respect to FIG. 3. As shown in FIG. 4, the method 400 includes one or more operations 402, 404, 406, 408, and 410.

Figure 8:
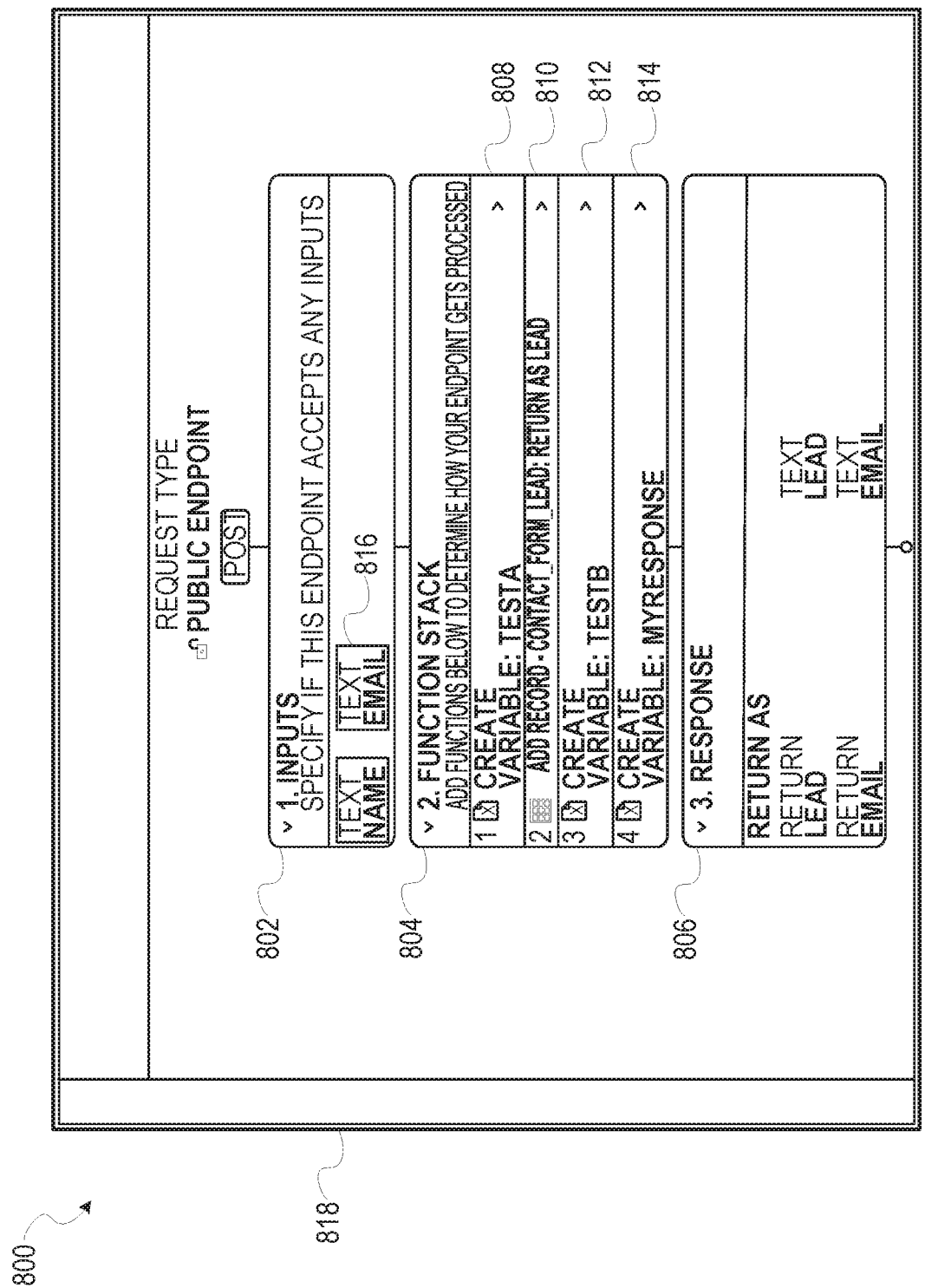
FIG. 8 illustrates an interface diagram depicting a GUI which may be presented by an API builder system, according to certain example embodiments.
Figure 9:
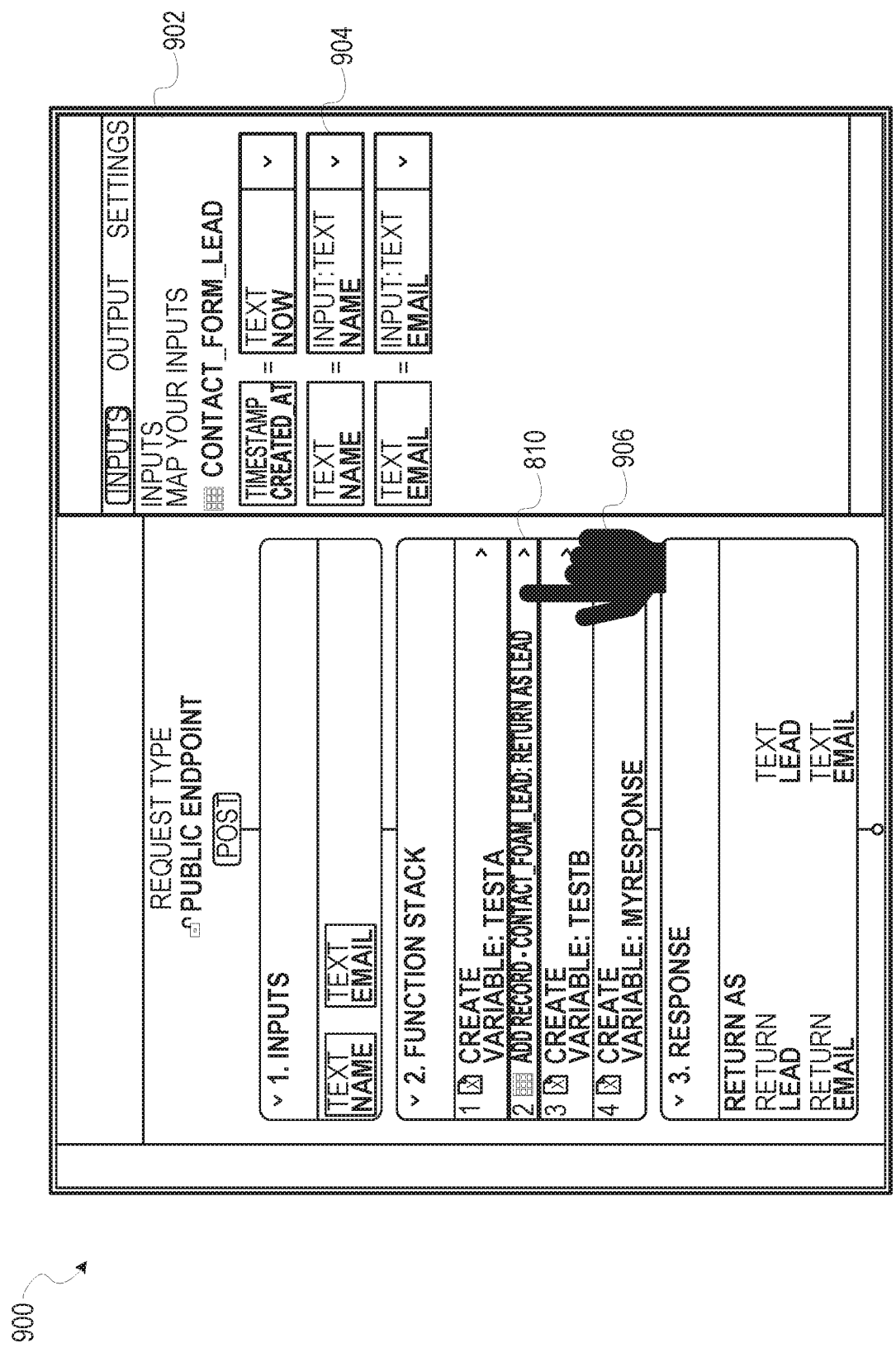
FIG. 9 illustrates an interface diagram depicting a GUI which may be presented by an API builder system, according to certain example embodiments.
Figure 10:
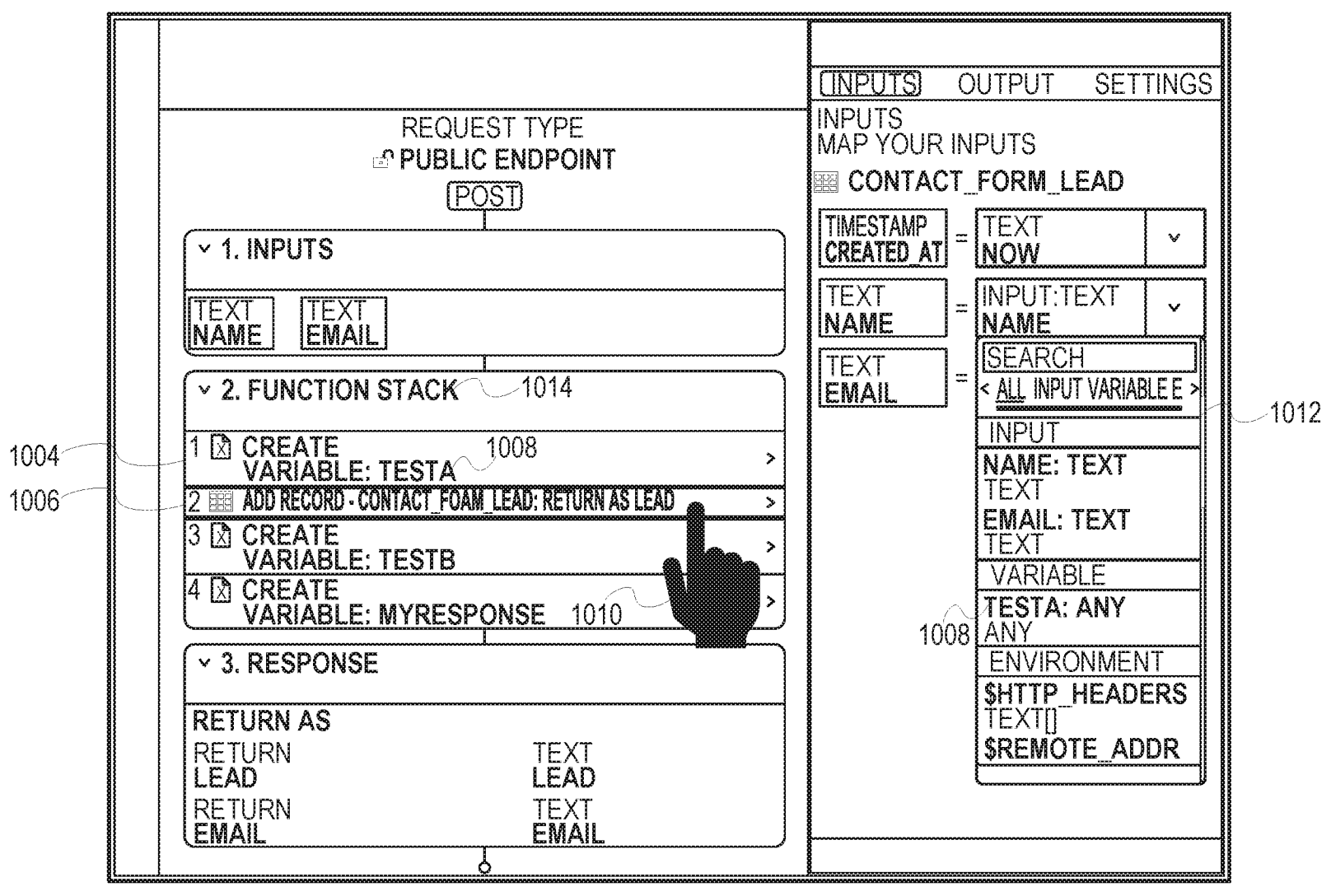

At operation 402, the interface module 302 generates and causes display of a GUI that comprises a presentation of a plurality of interface elements, as depicted in FIGS. 8, 9, and 10. Each interface element among the set of interface elements may correspond with a code extension associated with a particular command or function. In certain embodiments, the code extensions may include, but are not limited to, commands and functions such as conditionals, pre-conditionals, statements, and arrays. For example, in some embodiments, the plurality of interface elements may include: an "input" element that corresponds with code extension to automatically generate commands to define an input to an API; a "function stack" element, that corresponds with code extensions to automatically generate functions of a function stack based on user selections; and a "response" element, that corresponds with code extensions to automatically generate commands to define a response associated with an API. At operation 404, the input module 304 receives a selection of an interface element from among the plurality of interface elements.

At operation 406, the interface module 302 presents a menu element based on the selection of the interface element, wherein the menu element may comprise a display of one or more user selectable options that correspond with the selected menu element. For example, in some embodiments, the user selectable options may comprise a display of a plurality of API input types from which a user may select. At operation 408, the input module 304 receives a user input via the menu element, wherein the user input may include an input that selects or otherwise identifies an option (i.e., based on a radio selection), or may include a text input that comprises a text string into a text input field.

At operation 410, the code module 306 configures an API (i.e., an API endpoint) based on the user input received via the menu element. As an illustrative example, the user input may comprise a selection of an API input type from among a set of API input types. Based on the selection, the code module 306 may access the extension table 202 from the database 120 in order to generate code (i.e., a command) in which an input to the API based on the input type is defined.

FIG. 5 is a flowchart illustrating various operations of an API builder system 124 in performing a method 500 for configuring an API endpoint based on a user input received via a menu element, according to certain example embodiments. Operations of the method 500 may be performed by the modules described above with respect to FIG. 3. As shown in FIG. 5, the method 500 includes one or more operations 502, 504, and 506. According to certain embodiments, the method 500 may be performed as a subroutine of the method 400 discussed above.

At operation 502, the input module 304 receives a user input that defines a set of input parameters of an input to an API endpoint based on selections received through a menu element presented in a GUI. For example, the selections may include an input type from among a plurality of input types, as well as an input identifier, wherein the input identifier comprises a text string which may be assigned to the input and referenced by a command.

At operation 504, the input module 304 receives a second user input that selects an interface element from among the set of interface elements. For example, the interface element may correspond with a function of a function stack associated with the API, wherein a user may define a command of the function stack based on user inputs received via menu elements. Accordingly, at operation 506, the interface module 302 causes display of a menu element in response to the input that selects the interface element, wherein the menu element may comprise a display of a set of user selectable options that include the input identifier of the input to the API endpoint which was defined based on the user input. A user may therefore select the input identifier, and in response, the code module 306 may generate a command that references the input based on the input identifier.

FIG. 6 is a flowchart illustrating various operations of an API builder system 124 in performing a method 600 for presenting a GUI to receive inputs to configure an API endpoint, according to certain example embodiments. Operations of the method 600 may be performed by the modules described above with respect to FIG. 3. As shown in FIG. 6, the method 600 includes one or more operations 602, 604, and 606. According to certain embodiments, the method 600 may be performed as a subroutine of the method 400, and the method 500 discussed above.

At operation 602, the input module receives an input that defines a parameter of a command associated with a function via a menu element presented within a GUI. For example, the parameter may include an input that defines a variable or identifies a source of a variable. At operation 604, responsive to the input that defines the parameter, the code module 306 generates pseudo-code based on the command. At operation 606, the output module 308 causes display of a presentation of the pseudo-code within the GUI.

FIG. 7 is a flowchart illustrating various operations of an API builder system 124 in performing a method 700 for configuring an API endpoint based on a user input received via a menu element, according to certain example embodiments. Operations of the method 700 may be performed by the modules described above with respect to FIG. 3. As shown in FIG. 7, the method 700 includes one or more operations 702, 704, 706, and 708. According to certain embodiments, the method 700 may be performed as a subroutine of the method 400, and the method 500 discussed above.

At operation 702, the code module 306 generates a function based on a user input received through a menu element of a GUI, wherein the function comprises a command that defines a variable (i.e., a precondition). For example, the user input may select parameters of the command from a menu element that comprises a display of user selectable options, wherein the parameters may define attributes of an output of the command, such as a variable.

At operation 704, the interface module 302 presents an interface element that represents the function at a position among a sequence of interface elements, wherein the position among the sequence of interface elements precedes a second interface element. For example, as seen in FIG. 10, an interface element 1004 may correspond with a function that includes a command to define a variable (i.e., variable 1008 "TEST A"), wherein the interface element 1004 precedes an interface element 1006.

At operation 706, the input module 304 receives an input that selects the second interface element from among the set of interface elements (i.e., the input 1010 that selects the interface element 1006). Responsive to receiving the input, at operation 708 the interface module 302 presents a menu element that comprises display of one or more menu elements to define parameters of a command of a function, wherein a menu element (i.e., the menu element 1012) from among the one or more menu elements includes a display of the variable (i.e., variable 1008) defined by the command that corresponds with the preceding function (i.e., of the interface element 1004). Accordingly, the position of the interface element 1004 relative to the interface element 1006 defines whether or not a result/output associated with a command of the interface element 1004 will appear as a user selectable option within a menu associated with the interface element 1006.

FIG. 8 illustrates an interface diagram 800, according to certain example embodiments. As seen in the interface diagram 800, the API builder system 124 may generate and cause display of a GUI 818 to configure an API, wherein the GUI 818 includes a display of a set of interface elements (i.e., interface elements 802, 804, and 806), wherein each interface element among the set of interface elements may correspond with a components of an API, such as an interface element 802 to define inputs to the API, an interface element 804 to define a function stack of the API, and an interface element 806 to define a response which may be generated by the API.

According to certain embodiments, a user may provide an input to the interface element 802 in order to display a menu element to define one or more inputs to an API. For example, the inputs may define parameters of an input, such as an input type, as well as an identifier to be associated with the input. Responsive to receiving the inputs to define the parameters of the input, the API builder system 124 may present one or more graphical icons that represent the defined inputs, such as the graphical icon 816. As seen in the interface diagram 800, the graphical icon 816 define a text-based input that has been assigned the identifier, "EMAIL."

According to certain embodiments, a user may provide an input to the interface element 804 in order to display a menu element to define one or more functions associated with a function stack of an API, wherein the functions comprise commands. As seen in the interface diagram 800, the API builder system 124 may present a representation of each function of a function stack, such as the interface elements 808, 810, 812, and 814. Accordingly, a sequence of the representations within the interface element 804 may define a calling sequence associated with the function stack.

According to certain embodiments, a user may provide an input to the interface element 806 in order to define a response which may be performed by the API. For example, the input may select one or more elements (i.e., variables), as well as instructions for presenting or displaying the elements. For example, a user may configure the API to present the selected elements in the body of an email.

FIG. 9 illustrates an interface diagram 900 of a GUI which may be presented by the API builder system 124, according to certain example embodiments. As seen in the interface diagram 900, and as described in operation 406 and 408 of the method 400 depicted in FIG. 4, the API builder system 124 may receive an input 906 that selects the interface element 810 from among the set of interface elements, wherein the interface element 810 corresponds with a function of a function stack, and in response, presents a menu element 902, wherein the menu element 902 comprises a display of one or more user selectable options. In some embodiments, responsive to receiving the input 906 that selects the interface element 810, the output module 308 may generate a preview of the function or command that corresponds with the selected interface element 810, in order for in the interface module 302 to display the preview at a position within the GUI, such as the position 908.

As seen in the interface diagram 900, the user selectable options may include a dropdown menu 904, wherein elements presented within the dropdown menu 904 may be based on a position of the function that corresponds with the interface element 810 in a calling sequence of the function stack, and wherein the calling sequence of the function stack is based on the sequence of each interface element.

FIG. 10 illustrates an interface diagram 1000 of a GUI which may be presented by the API builder system 124, according to certain example embodiments. As seen in the interface diagram 1000, and as described in operation 704 and 706 of the method 700, an interface element 1004 may correspond with a function that includes a command to define a variable (i.e., variable 1008 "TEST A"), wherein the interface element 1004 precedes an interface element 1006.

As seen in the interface diagram 1000, the API builder system 124 may receive an input 1010 that selects the interface element 1006, wherein the interface element 1006 corresponds with a function of the function stack 1014. Responsive to receiving the input 1010 that selects the interface element 1006, the API builder system 124 presents a menu element 1012 that comprises display of one or more menu elements to define parameters of a command of a function that corresponds with the interface element 1006.

As seen in the interface diagram 1000, the menu element 1012 includes a display of the variable 1008, wherein the variable 1008 is defined by the command that corresponds with the interface element 1004. Accordingly, the position of the interface element 1004 relative to the interface element 1006 defines whether or not a result/output associated with a command of the interface element 1004 will appear as a user selectable option within a menu associated with the interface element 1006.

Software Architecture

Figure 11:
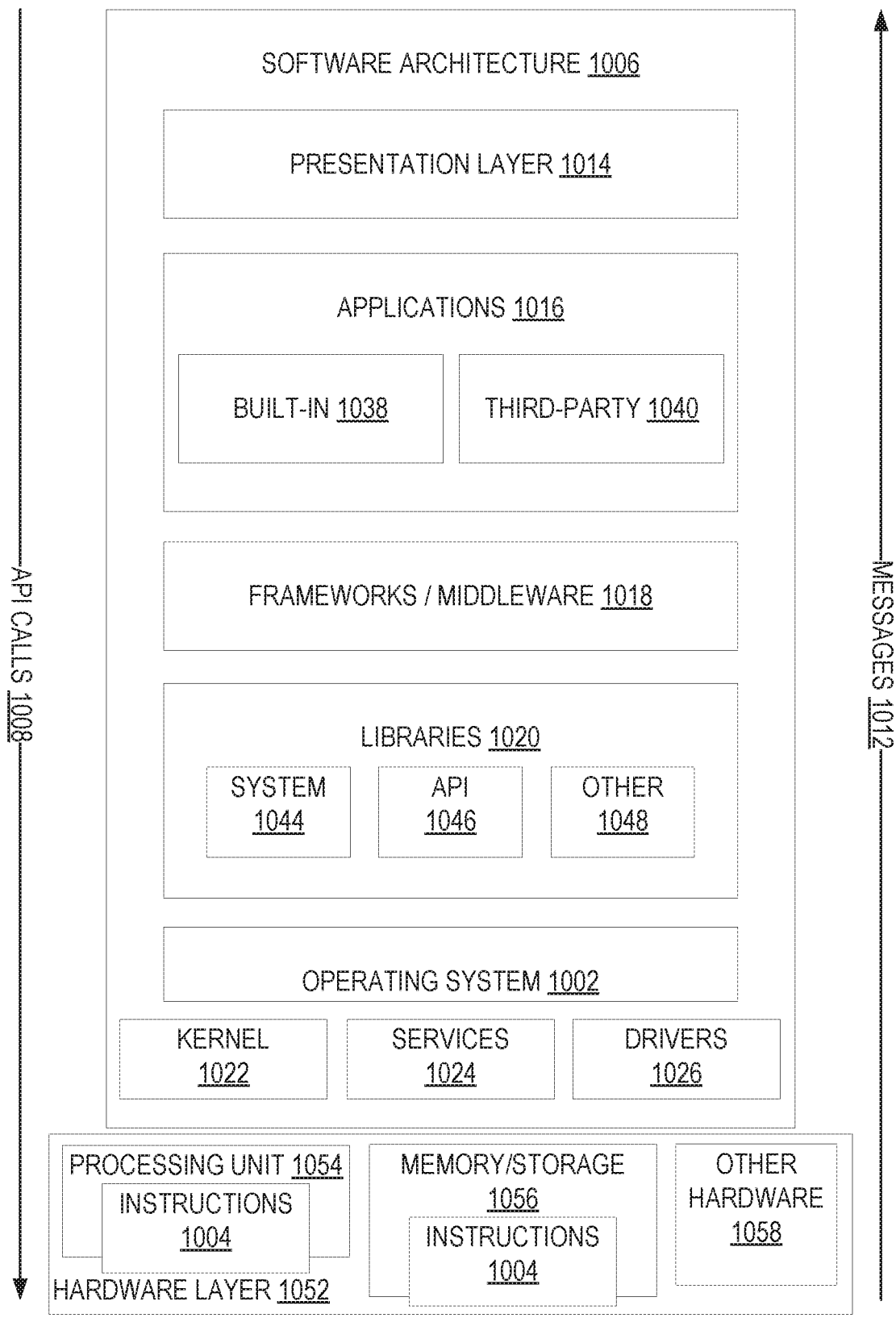
FIG. 11 is a block diagram illustrating a representative software architecture, which may be used in conjunction with various hardware architectures herein described and used to implement various embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1206 may execute on hardware such as machine 1200 of FIG. 12 that includes, among other things, processors 1204, memory 1214, and I/O components 1218. A representative hardware layer 1152 is illustrated and can represent, for example, the machine 1200 of FIG. 12. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL, framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various GUI functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. The third-party applications 1140 may invoke the API calls 1108 provided by the mobile operating system (such as operating system 1102) to facilitate functionality described herein.

Figure 12:
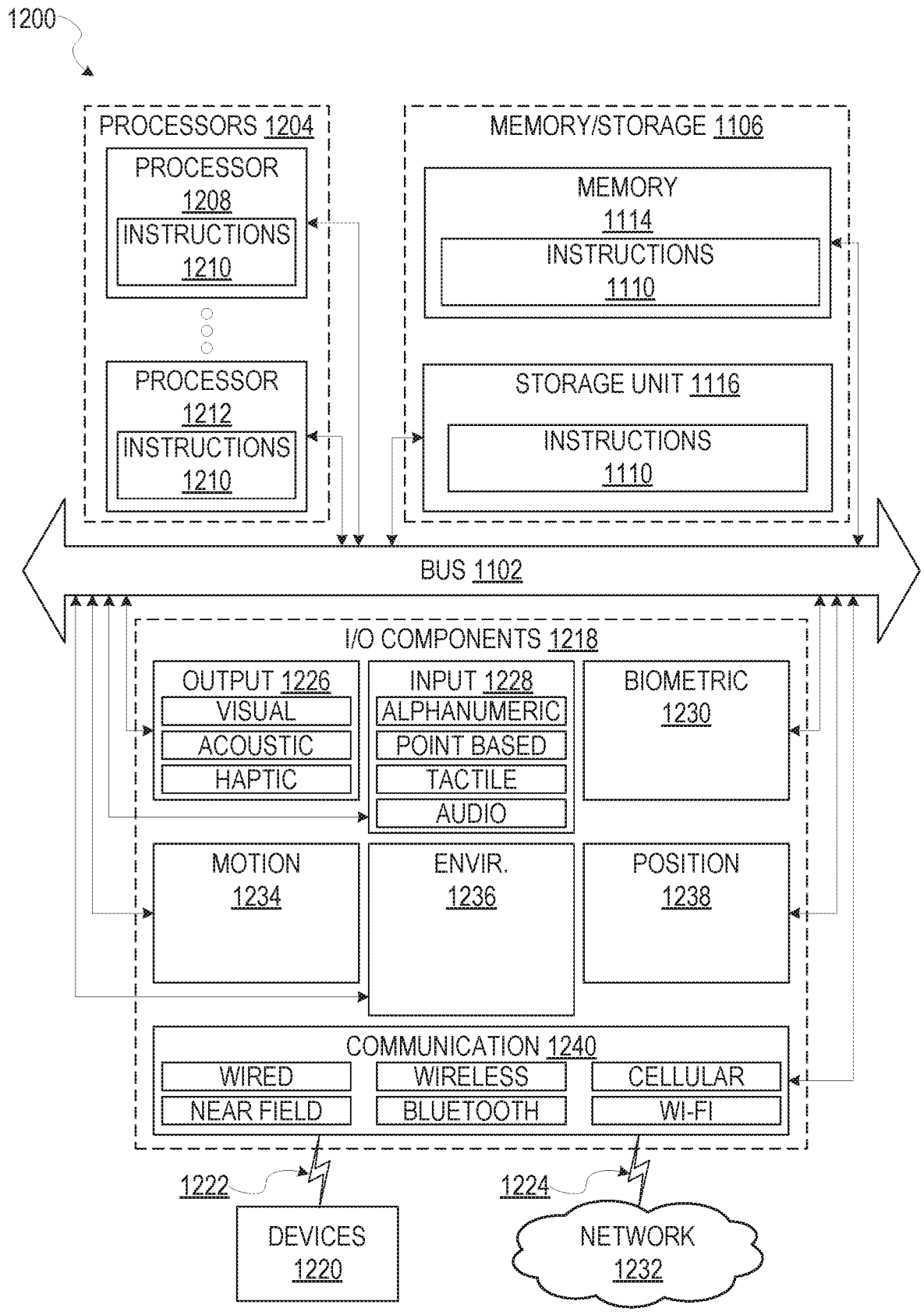
FIG. 12 is a block diagram illustrating components of a machine, according to some example embodiments, able to read instructions from a machine-readable medium (e.g., a machine-readable storage medium) and perform any one or more of the methodologies discussed herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user. FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental components 1236, or position components 1238 among a wide array of other components.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed. Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner, in various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

What is claimed is:

1. A system comprising:
a memory; and
at least one hardware processor coupled to the memory and comprising instructions that causes the system to perform operations comprising:
causing display of a graphical user interface (GUI) that comprises a presentation of a plurality of interface elements that include an interface element that represents a function of a function stack, and wherein a first position of the interface element among a sequence the plurality of interface elements defines a calling sequence of the function among the function stack;
receiving an input that moves the interface element from the first position among the sequence of the plurality of interface elements to a second position among the sequence of the plurality of interface elements;
updating the calling sequence associated with the function that corresponds with the interface element based on the second position of the interface elements among the sequence of interface elements;
receiving a selection of the interface element;
presenting a menu element in response to the selection of the interface element;
receiving a user input via the menu element; and
configuring an Application Programming Interface (API) endpoint based on the user input received via the menu element.

2. The system of claim 1, wherein the user input defines a set of input parameters of an API input that corresponds with the API, the set of input parameters including at least an input type, and an input identifier.

3. The system of claim 2, wherein the interface element is a first interface element, the menu element is a first menu element that corresponds with the first interface element, and wherein the operations further comprise:
receiving an input that selects a second interface element from among the plurality of interface elements; and
presenting a second menu element in response to the input that selects the second interface element, the second menu element including a display of the input identifier of the API input.

4. The system of claim 2, wherein the operations further comprise:
generating the function based on the set of input parameters of the user input;
generating pseudo-code based on the command; and
causing display of the pseudo-code within the menu element.

5. The system of claim 1, wherein the configuring the API based on the user input received via the menu element includes:
configuring the function of the function stack associated with the API based on the user input received via the menu element.

6. The system of claim 1, wherein the interface element is a first interface element that precedes a second interface element within the sequence of the presentation of interface elements, wherein the function represented by the first interface element comprises a command that defines a variable, the menu element is a first menu element, the selection is a first selection, and wherein the operations further comprise:
receiving a second selection that selects the second interface element; and
presenting a second menu element that comprises a display of a set of variables in response to the second selection, the display of the set of variables including the variable defined by the command based on the position of the first interface element within the sequence.

7. A method comprising:
causing display of a graphical user interface (GUI) that comprises a presentation of a plurality of interface elements that include an interface element that represents a function of a function stack, and wherein a first position of the interface element among a sequence the plurality of interface elements defines a calling sequence of the function among the function stack;
receiving an input that moves the interface element from the first position among the sequence of the plurality of interface elements to a second position among the sequence of the plurality of interface elements;
updating the calling sequence associated with the function that corresponds with the interface element based on the second position of the interface elements among the sequence of interface elements;

receiving a selection of the interface element;
presenting a menu element in response to the selection of the interface element;
receiving a user input via the menu element; and
configuring an Application Programming Interface (API) endpoint based on the user input received via the menu element.

8. The method of claim 7, wherein the user input defines a set of input parameters of an API input that corresponds with the API, the set of input parameters including at least an input type, and an input identifier.

9. The method of claim 8, wherein the interface element is a first interface element, the menu element is a first menu element that corresponds with the first interface element, the selection is a first selection, and wherein the method further comprises:
   receiving a second selection that selects a second interface element from among the plurality of interface elements; and
   presenting a second menu element in response to the second selection, the second menu element including a display of the input identifier of the API input.

10. The method of claim 8, wherein the method further comprises:
   generating the function based on the set of input parameters of the user input, the function comprising a command;
   generating pseudo-code based on the command; and
   causing display of the pseudo-code within the menu element.

11. The method of claim 8, wherein the configuring the API based on the user input received via the menu element includes:
   generating a function of a function stack associated with the API based on the user input received via the menu element, the function comprising a command.

12. The method of claim 8, wherein the interface element is a first interface element that precedes a second interface element within the sequence of the presentation of interface elements, wherein the function represented by the first interface element comprises a command that defines a variable, the menu element is a first menu element, the selection is a first selection, and wherein the operations further comprise:
   receiving a second selection that selects the second interface element; and
   presenting a second menu element that comprises a display of a set of variables in response to the second selection, the display of the set of variables including the variable defined by the command based on the position of the first interface element within the sequence.

13. A non-transitory machine-readable storage medium, comprising instructions that when executed by one or more processors of a machine, cause the machine to perform operations comprising:
   causing display of a graphical user interface (GUI) that comprises a presentation of a plurality of interface elements that include an interface element that represents a function of a function stack, and wherein a first position of the interface element among a sequence of the plurality of interface elements defines a calling sequence of the function among the function stack;
   receiving an input that moves the interface element from the first position among the sequence of the plurality of interface elements to a second position among the sequence of the plurality of interface elements;
   updating the calling sequence associated with the function that corresponds with the interface element based on the second position of the interface elements among the sequence of interface elements;
   receiving a selection of the interface element;
   presenting a menu element in response to the selection of the interface element;
   receiving a user input via the menu element; and
   configuring an Application Programming Interface (API) endpoint based on the user input received via the menu element.

14. The non-transitory machine-readable storage medium of claim 13, wherein the user input defines a set of input parameters of an API input that corresponds with the API, the set of input parameters including at least an input type, and an input identifier.

15. The non-transitory machine-readable storage medium of claim 14, wherein the interface element is a first interface element, the menu element is a first menu element that corresponds with the first interface element, the selection is a first selection, and wherein the operations further comprise:
   receiving a second selection that selects a second interface element from among the plurality of interface elements; and
   presenting a second menu element in response to the second selection, the second menu element including a display of the input identifier of the API input.

16. The non-transitory machine-readable storage medium of claim 15, wherein the operations further comprise:
   generating the function based on the set of input parameters of the user input;
   generating pseudo-code based on the command; and
   causing display of the pseudo-code within the menu element.

* * * * *